UNITED STATES PATENT OFFICE.

SPENCER B. NEWBERRY AND HARVEY N. BARRETT, OF BAYBRIDGE, OHIO.

PROCESS OF MAKING BARIUM HYDRATE.

1,106,578.  Specification of Letters Patent.  Patented Aug. 11, 1914.

No Drawing.   Application filed April 19, 1912.  Serial No. 691,959.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Processes of Making Barium Hydrate, of which the following is a specification.

Our invention relates to the production of barium hydrate from barium sulfate by the use of high temperatures applied to barium sulfate mixed with inert non-water-soluble substances.

We will first state a practical example of the working of the process and then explain its action more fully.

We take a suitable quantity of ordinary native barite and mix it with about twice its weight of an infusible non-water-soluble oxid such as magnesia and grind the mixture to powder, preferably such that 90% will pass through a 100-mesh screen. The mixture is then gradually fed in at the upper end of a slightly inclined cylindrical revolving kiln lined with refractory material, preferably of a basic character, and heated internally, as, for example, by a flame of coal-dust, oil or gas. The material descends gradually toward the source of heat and is raised to an intense white heat, not less than approximately 2700° Fahrenheit, and in its passage is continually agitated and turned over in contact with the highly heated gases with which the kiln is filled. On reaching this high temperature, to which the material can be raised and at which it can be maintained without fear of its being fused because of the presence of the infusible or inert material, sulfur dioxid and oxygen are rapidly evolved and pass out with the products of combustion, from which they may be collected by methods which form no part of the invention herein described. The calcined product is discharged from the kiln usually in the form of small rounded pieces consisting chiefly of barium oxid and magnesia oxid. This is cooled, coarsely pulverized and treated with a sufficient quantity of hot water to convert the barium oxid present into a solution of barium hydrate. This solution is then filtered from the undissolved magnesia and any undecomposed barium sulfate. On cooling the solution barium hydrate crystallizes out. The insoluble residue may be used for admixture with a further quantity of barium sulfate.

By the term insoluble as here used, we mean non-water-soluble or insoluble in water. By mixing the barium sulfate with an infusible material, the tendency of the high temperature to fuse the barium sulfate and thus prevent the formation of barium oxid is prevented, and by using an insoluble or non-water-soluble substance, the calcined product, which contains barium oxid, is capable of being treated with water so as to both form the desired barium hydrate and separate the water-soluble barium oxid or barium hydrate formed in the process from the insoluble residue.

The process proceeds somewhat as follows: The decomposition of the barium sulfate into barium oxid with evolution of sulfur dioxid and oxygen may be rendered more rapid and uniform by the admixture with the sulfate before calcination of a suitable amount of inert material infusible at the temperature of calcination and insoluble in water. The effect of this inert material is to prevent the fusion of the mass and to maintain it in a porous, open and subdivided condition, thus facilitating close contact of the particles of sulfate with the highly-heated gases of the kiln and permitting free escape of the gaseous products evolved in the decomposition of the sulfate. The inert substances which we find most effective for this purpose are those of a basic and infusible character which show no tendency to combine chemically with the barium oxid produced by the calcination and which are insoluble in water so as to permit the subsequent separation of the barium oxid or its product, barium hydrate, from the inert material. Among substances of this general class which we have found especially effective and also readily available, are the alkaline earths or alkaline-earth-metal oxids and oxids of the magnesia group, especially the oxids of calcium and magnesium commonly known respectively as lime and magnesia. Other compounds of the above elements or other elements, which on calcination are converted into the corresponding oxids insoluble in water, may be used in place of the oxids, as, for example, the carbonates, hydrates and sulfates of the metals above named and also the chlorids of metals of the magnesia group. Under some conditions or for special purposes, oxids or other compounds of certain other metals of the above groups may also be used with advantage, for example, oxids or compounds of zinc, cadmium or beryllium. Therefore, we desire it to be understood that our invention applies broadly to the calcination of barium sulfate in admixture with any oxid which at the temperature of calcination is infusible and does not form with barium oxid a compound not readily converted into barium hydrate on treatment with water or which is insoluble in water, or with any compound which is converted into such oxid by calcination or with a mixture of such oxids or compounds. The term inert is, therefore, in this specification to be taken with the significance suggested by the above explanation. The first or preliminary product of the calcination of barium sulfate with such an inert, infusible and insoluble material as above referred to, is a mixture of barium oxid and the added oxid with perhaps a little undecomposed barium sulfate. The added oxid will be practically insoluble in water. To separate the barium oxid from this insoluble oxid it is only necessary, therefore, to treat the calcined product with water, thus converting the barium oxid into hydrate, and to then dissolve this barium hydrate in hot water. The hot solution can then be filtered from the insoluble added oxid and allowed to cool, thus effecting the separation. Thereupon nearly all the barium hydrate will be deposited in crystalline form and the insoluble oxid may be used again as an addition to a new charge of barium sulfate.

In the foregoing description we have first given a practical illustration of our process and we have then described it in more general terms, but it will be understood, of course, that considerable variation may be had from what has been stated in detail without departing materially from the spirit of our invention. The quantities of water used may be left to the judgment of the person using the process, as this is a mere matter of convenience and requires no special explanation. The temperature used can be considerably varied, but it should not fall very much below 2700° Fahrenheit. About or above that temperature seems to be the best. The material need not be as finely divided as we have suggested, but such fineness seems to be the best for the purpose. The calcination may be carried on in devices other than a rotary kiln.

It is possible that materials other than those we have suggested, having the properties we have pointed out, may be substituted. It is also possible that in the event of substances other than we have referred to being employed separation might take place by the use of other means and substances than leaching by water.

Of course, the various steps need not proceed in the exact sequence stated.

We claim:

1. The process of producing barium hydrate from barium sulfate which consists in mixing the latter with an infusible, insoluble material, finely dividing the mixture, subjecting the same to a high temperature until substantially all of the barium sulfate is converted into barium oxid, treating the calcined product with water until substantially all of the barium oxid is converted into barium hydrate and then separating the hydrate from the residue.

2. The process of producing barium hydrate from barium sulfate which consists in mixing the latter with an infusible, insoluble material, finely dividing the mixture, subjecting the same while in an agitated condition to a high temperature until substantially all of the barium sulfate is converted into barium oxid, treating the calcined product with water until substantially all of the barium oxid is converted into barium hydrate and then separating the hydrate from the residue.

3. The process of producing barium hydrate from barium sulfate which consists in mixing the latter with an infusible, insoluble material, finely dividing the mixture until approximately 90% of it will pass through a 100-mesh screen, subjecting the same to a high temperature until substantially all of the barium sulfate is converted into barium oxid, treating the calcined product with water until substantially all of the barium oxid is converted into barium hydrate and then separating the hydrate from the residue.

4. The process of producing barium hydrate from barium sulfate which consists in mixing the latter with an infusible, insoluble material, finely dividing the mixture until approximately 90% of it will pass through a 100-mesh screen, subjecting the same to a high temperature of not less than approximately 2700° Fahrenheit until substantially all of the barium sulfate is converted into barium oxid, treating the calcined product with water until substantially all of the barium oxid is converted into barium hydrate and then separating the hydrate from the residue by leaching out the barium hydrate and recovering it from the liquid.

5. The process of producing barium hydrate from barium sulfate which consists in mixing the latter with an infusible, insoluble material, finely dividing the mixture, subjecting the same while in an agitated condition to a high temperature of not less than approximately 2700° Fahrenheit or until substantially all of the barium sulfate is converted into barium oxid, treating the calcined product with water until substantially all of the barium oxid is converted into barium hydrate and then separating the hydrate from the residue by leaching out the barium hydrate and recovering it from the liquid.

6. A process of producing barium hydrate by calcining a mixture of barium sulfate with an insoluble alkaline-earth-metal oxid and treating the calcined product with water.

7. A process of producing barium hydrate by calcining a mixture of barium sulfate with an insoluble alkaline-earth-metal oxid until the sulfate is substantially converted into barium oxid with evolution of sulfur dioxid and oxygen, converting the resulting barium oxid into barium hydrate by treatment with water, and separating the barium hydrate so formed, from the oxid, by dissolving the barium hydrate in water.

8. A process of producing barium hydrate by calcining a mixture of barium sulfate and a substance which is converted by calcination into an insoluble alkaline-earth oxid and treating the calcined product with water.

9. A process of producing barium hydrate by calcining a mixture of barium sulfate and a substance which is converted by calcination into an insoluble oxid at a temperature exceeding 2700° Fahrenheit until the barium sulfate is substantially converted into barium oxid with evolution of sulfur dioxid and oxygen, converting the barium oxid so obtained into barium hydrate by treating the calcined product with water, and separating the resulting barium hydrate from the oxid, by dissolving the barium hydrate in water.

10. A process of producing barium hydrate by calcining a pulverized mixture of barium sulfate and a substance converted by calcination into an insoluble oxid, in such manner that the mixture shall travel continually toward the source of heat and shall be continually agitated to present fresh surfaces of material to contact with highly heated products of combustion and shall be raised to a temperature exceeding 2700° Fahrenheit and maintained at such temperature until the barium sulfate is substantially converted into barium oxid with evolution of sulfur dioxid and oxygen, treating the calcined product with water to convert the barium oxid into barium hydrate, and separating the resulting barium hydrate from the oxid by dissolving the hydrate in water.

Signed at Baybridge, O., this 16th day of April, 1912.

SPENCER B. NEWBERRY.
HARVEY N. BARRETT.

Witnesses:
IRVIN H. NUBER,
MINNIE M. LINDENAR.